United States Patent [19]

Bovenkerk et al.

[11] 4,224,380
[45] Sep. 23, 1980

[54] TEMPERATURE RESISTANT ABRASIVE COMPACT AND METHOD FOR MAKING SAME

[75] Inventors: Harold P. Bovenkerk; Paul D. Gigl, both of Worthington, Ohio

[73] Assignee: General Electric Company, Worthington, Ohio

[21] Appl. No.: 890,898

[22] Filed: Mar. 28, 1978

Related U.S. Application Data

[63] Continuation of Ser. No. 770,151, Feb. 18, 1977, abandoned.

[51] Int. Cl.³ .......................... C22C 3/00; B24D 3/00
[52] U.S. Cl. .................................. 428/545; 51/307; 51/309; 75/231; 75/243; 75/244; 428/550; 428/553; 428/564; 428/565; 428/566
[58] Field of Search ............... 75/243, 244, 231; 51/307, 309; 428/545, 550, 553, 564, 565, 566

[56] References Cited

U.S. PATENT DOCUMENTS

| | | | |
|---|---|---|---|
| 1,625,463 | 4/1927 | Gauthier | 75/243 |
| 2,077,345 | 4/1937 | Van Der Pyl | 75/243 |
| 2,137,200 | 11/1938 | Boyer | 75/243 |
| 2,137,201 | 11/1938 | Boyer | 75/243 |
| 2,173,833 | 9/1939 | Fritz-Randolf | 75/243 |
| 2,238,351 | 4/1941 | Van Der Pyl | 75/243 X |
| 2,270,209 | 1/1942 | Van Der Pyl | 75/243 X |
| 2,367,358 | 1/1945 | Kott et al. | 75/243 |
| 2,561,709 | 7/1951 | Norling | 75/243 |
| 2,578,167 | 12/1951 | Björklund et al. | 75/243 X |
| 3,306,720 | 2/1967 | Darrow | 75/243 X |
| 3,574,580 | 4/1971 | Stromberg et al. | 51/307 |
| 3,609,818 | 10/1971 | Wentorf | 18/34 R |
| 3,663,191 | 5/1972 | Kroder | 75/243 X |
| 3,743,489 | 7/1973 | Wentorf et al. | 51/307 |
| 3,745,623 | 7/1973 | Wentorf et al. | 29/95 B |
| 3,767,371 | 10/1973 | Wentorf et al. | 51/307 |
| 3,829,544 | 8/1974 | Hall | 51/307 X |
| 3,913,280 | 10/1975 | Hall | 51/307 |

*Primary Examiner*—Richard E. Schafer
*Attorney, Agent, or Firm*—Morgan, Finnegan, Pine, Foley & Lee

[57] ABSTRACT

In one embodiment, a compact for tools, such as cutting, drilling and shaping tools, consists essentially of self-bonded abrasive particles. The bonded particles define a substantially continuous interconnected network of pores, dispersed throughout the compact. The method for making such a compact comprises the steps of bonding a mass of abrasive particles, aided by a sintering aid material, under high temperatures and pressures (HP/HT) to form an abrasive body comprised of said particles in a self-bonded form and said material infiltrated throughout the body. The body is then treated to remove substantially all infiltrated material, thereby to produce a compact consisting essentially of the self-bonded abrasive particles. In another embodiment, a composite compact which is made in a similar manner to the first embodiment consists essentially of a layer of self-bonded abrasive particle and a substrate layer (preferably of cemented carbide) bonded to the abrasive particle layer.

16 Claims, 1 Drawing Figure

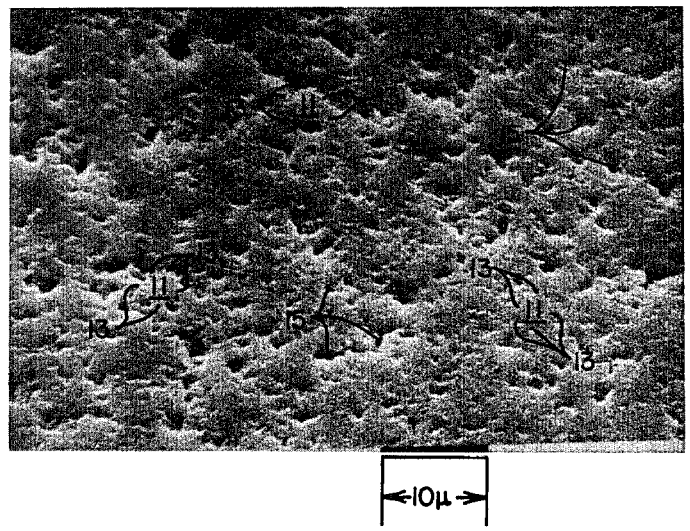

TEMPERATURE RESISTANT ABRASIVE COMPACT AND METHOD FOR MAKING SAME

This is a continuation of application Ser. No. 770,151, filed Feb. 18, 1977, now abandoned.

BACKGROUND OF THE INVENTION

This invention relates to machine tools and more particularly to machine tool components comprised of compacts of abrasive particles such as diamond or cubic boron nitride.

It has been found that a diamond compact made in accordance with the teaching of U.S. Pat. Nos. 3,745,623 and 3,609,818—Wentorf et al. is limited in its application because it is thermally degraded at temperatures above approximately 700° C. Similarly, it has been found that a cubic boron nitride (CBN) compact made in accordance with the teaching of U.S. Pat. Nos. 3,767,371 and 3,743,489 is limited in its application. It is also thermally degraded at temperatures above approximately 700° C. This prevents the use of such compacts in applications requiring (1) the bonding of the compact to a support by a brazed material with a melting point close to or above the thermal degradation point of the compact or (2) the molding of the compact in a high melting point, abrasion resistant matrix such as is commonly used in a surface-set rock drill crown.

Accordingly, it is an object of this invention to provide a strong, self-bonded abrasive particle compact which has an improved resistance to thermal degradation at high temperatures.

Another object of this invention is to provide an improved abrasive compact for use as cutting, drilling and shaping tool blanks.

SUMMARY OF THE INVENTION

The foregoing objects and others, which will be apparent from a consideration of the following detailed description in connection with the accompanying claims, are accomplished by providing a machine tool component comprised of a compact consisting essentially of self-bonded abrasive particles with an interconnected network of pores dispersed throughout. The compact is produced by bonding a mass of abrasive particles into a self-bonded body through the use of a sintering aid material under high pressures and temperatures (HP/HT). The body formed at HP/HT includes the self-bonded particles with the sintering aid material (e.g., cobalt or cobalt alloys) infiltrated throughout the body. The infiltrant is then removed, for example, by immersion of the body in an aqua regia bath. It has been discovered that the removal of substantially all of the infiltrant provides an abrasive particles compact which has substantially improved resistance to thermal degradation at high temperatures.

In another embodiment, a composite compact which is made in a similar manner to the first embodiment consists essentially of a layer of self-bonded abrasive particle and a substrate layer (preferably of cemented carbide) bonded to the abrasive particle layer.

BRIEF DESCRIPTION OF THE DRAWING

The drawing is a photomicrograph of a portion of a ground surface of a diamond compact made in accordance with features of this invention.

DESCRIPTION OF THE PREFERRED EMBODIMENTS

While the FIGURE in fact shows a diamond compact, it is equally illustrative of alternative embodiments of this invention in which the abrasive particles are cubic boron nitride (CBN).

The compact comprises diamond particles 11 which comprise between 70% and 95% by volume of the compact. (Particle is used herein to mean an individual crystallite or a fragment thereof.) Interfaces 13 are representative of the self-bonding of or diamond to diamond bonding between adjacent particles 11. The same diamond crystals 11 seen in the ground surface of the compact shown in the drawing are bonded in the third dimension to adjacent diamond crystals (not seen). A metallic phase of sintering aid material (not shown in the drawing) is infiltrated substantially uniformly throughout the compact and is believed to be encapsulated in closed regions formed by adjacent diamond particles. This phase comprises between about 0.05% and 3% by volume of the compact. A network of interconnected empty pores 15 are dispersed throughout the compact and are defined by the diamond particles 11 and the metallic phase (not shown). The pores 15 comprise between about 5% and 30% by volume of the component.

In one embodiment the compact is comprised solely of the self-bonded particles. In a second embodiment, the compact is bonded to a substrate (not shown) preferably of cobalt cement tungsten carbide.

Acceptable particle size range for diamond particles 11 is between 1 and 1000 micrometers. For CBN, the acceptable size range is between 1 to 300 micrometers.

Briefly, a preferred embodiment of a method for preparing a tool component in accordance with features of this invention comprises the steps of:

(a) placing within a reaction cell or charge assembly a mass of abrasive particles selected from the group consisting of diamond and CBN, and a mass of material which is active as a sintering aid for the selected abrasive particle mass;

(b) simultaneously subjecting the cell and the contents thereof to temperatures in the range of 1200° C. to 2000° C. and pressures in excess of 40 kbars;

(c) ceasing the input of heat to the cell;

(d) removing the pressure applied to the cell;

(e) removing from the cell an abrasive body formed by steps (a) to (d) and which is comprised of the particles in self-bonded form with a metallic phase comprised of the sintering aid material infiltrated throughout the abrasive body; and (f) removing substantially all of the metallic phase which is infiltrated throughout the body.

"Simultaneously," step (b) above, is used herein to mean that the HP/HT conditions exist or occur at the same time but does not require that the times of initiation or termination of the HP and HT conditions be coincident (although the times may be).

"Sintering aid material" is used herein to refer to materials which are a catalyst for diamond as hereinafter identified and/or which promotes the sintering of CBN as hereinafter identified. The mechanism (catalytic or otherwise) by which the sintering aid materials promote the self-bonding of CBN is not known.

Preferred embodiments of steps (a) through (e) of the above method for making a tool component of diamond particles are more fully described in U.S. Pat. Nos.

3,745,623 and 3,609,818 which are hereby incorporated by reference herein.

Briefly, as described in these patents, diamond compacts are prepared by HP/HT processing, wherein hot, compressed diamond particles are infiltrated with a catalytic material by axial or radial sweep-through of the material through the diamond particles. During sweep-through catalyzed sintering of the diamond particles occurs leading to extensive diamond to diamond bonding. As disclosed in U.S. Pat. Nos. 2,947,609 and 2,947,610 (both of which are hereby incorporated herein by reference), the catalytic material is selected from the group consisting of (1) a catalytic metal, in elemental form, selected from the group consisting of group VIII metals Cr, Mn, Ta; (2) a mixture of alloyable metals of the catalytic metal(s) and non-catalytic metal(s); (3) an alloy of at least two of said catalytic metals; and (4) an alloy of the catalytic metal(s) and non-catalytic metal(s). Cobalt in elemental or alloy form is preferred. This material forms a metallic phase in the abrasive body formed at HP/HT as denoted in step (e) above.

Preferred embodiments of steps (a) through (e) of the above method for making a tool component of CBN particles is more fully described in U.S. Pat. No. 3,767,371 which is hereby incorporated by reference herein. As described in and in connection with Example 1 of this patent, CBN compacts are prepared by a HP/HT process in which CBN particles are infiltrated with a molten sintering aid material (cobalt metal) by axial sweep-through of the material through the CBN particles. During sweep-through, sintering of the CBN particles occurs leading to extensive CBN to CBN bonding. Other materials which are operable as sintering aids for CBN are disclosed in U.S. Pat. No. 3,743,489 col. 3, line 6 through line 20, are alloys of aluminum and an alloying metal selected from the group consisting of nickel, cobalt, maganese, iron, vanadium and chromium. Cobalt and alloys of cobalt are preferred. The sintering aid material forms the metallic phase denoted in step (e) above.

In the practice of one embodiment of steps (a) through (e) according to U.S. Pat. Nos. 3,745,623; 3,767,371 and 3,743,489, a composite compact is made by the in situ bonding of an abrasive particle layer (diamond or CBN) to a cemented carbide substrate. The material for forming the carbide substrate (either from a carbide molding powder or from a preformed body) is the preferred source of the sintering aid material. Reference can be made to U.S. Pat. No. 3,745,623 col. 5, lines 58 to col. 6, line 8 and col. 8, lines 57 to col. 9, line 9 for exemplary details of the substrate.

Another embodiment of this invention is directed to the formation of a compact consisting essentially of self-bonded abrasive particles. In this embodiment steps (a) through (e) are practiced in the same manner described above except that the provision of the material for the formation of the carbide support for the abrasive particle layer either as carbide molding powder or in a preformed state is preferably omitted. When this is done, the sintering aid material is separately added, e.g., as shown and described in U.S. Pat. No. 3,609,818. Of course, a support of cemented carbide or other material may be brazed to the compact, after removal of the metallic phase (step f), to form a tool blank or insert.

In accordance with the features of this invention, it has been discovered that the metallic phase can be removed from the compact by acid treatment, liquid zinc extraction, electrolytic depleting or similar processes, leaving a compact of substantially 100% abrasive particles in self-bonded form. Thus, the compact has substantially no residual metallic phase to catalyze back-conversion of the abrasive particle bonds and/or to expand and thereby break the particle bonds, these being the two mechanisms by which it is theorized that the prior art compacts thermally degraded at high temperature. It has been found that the compact produced in accordance with this invention can withstand exposure to temperatures up to 1200° C. to 1300° C. without substantial thermal degradation.

EXAMPLE I

A plurality of disc shaped diamond compacts was prepaed by (1) placing a 1.4 mm layer of fine diamond particles nominally less than 8 micrometers and 3.2 mm thick × 8.8 mm diameter cemented tungsten carbide (13 weight percent Co, 87 weight percent WC) within a 0.05 mm zirconium container assembly; (2) stacking a number of these assemblies within a HP/HT apparatus in FIG. 1 of vessel in U.S. Pat. No. 3,745,623; (3) increasing pressure to about 65 kb and about 1400° C. temperature for 15 min; (4) quenching slowly temperature first and then pressure; (5) removing the samples from the HP/HT apparatus and grinding the samples to obtain compacts with a 0.5 mm thick diamond bonded to the cobalt cemented tungsten carbide layer of 2.7 mm thickness. The carbide layer of each compact was removed by surface grinding.

As indicated in TABLE I, half of the samples were leached in hot concentrated acid solutions to remove the metallic phase and any other soluble non-diamond materials. Two different methods were used to remove the infiltrant. For a first group, denoted as Samples A-1 and A-4, only hot 1:1 concentrated nitric-hydrofluoric acid was used to treat Samples A-3 and A-4. For a second group, denoted as samples B-1 to B-4, the nitric-hydrofluoric acid was alternated with hot 3:1 concentrated hydrochloric-nitric acid (aqua regia) to treat Samples B-3 and B-4. It was found that the removal rate markedly increased by using the latter acid solution. Samples A-3 and A-4 were acid treated for periods of time between eight and twelve days. Samples B-3 and B-4 were treated between three and six days. For both methods during acid treatment, the dimension of the samples did not change and no spalling of the diamond was detected. Therefore, any weight loss is attributable to the removal of the metallic phase infiltrant because diamond is not dissolved by the acids.

The quantity of metallic phase infiltrant in such compacts was calculated to be about 8.1% by volume, or 19.8% by weight, based on density measurements of the compact, before leaching, and of the diamond and metal starting materials for making the compact. After leaching about 0.5% by volume or 0.2% by weight, of the infiltrant remains. The removal of up to 90% by weight (Sample B-4) of the infiltrant also indicates that the location of most of the metallic phase is in a continuous network of pores. Scanning electron microscope (SEM) examination of a fractured surface of a leached sample shows that the network of pores runs throughout the diamond layer. The holes are found to be distributed throughout the layer and most are less than a micron in diameter. This indicates that the acid penetrated the entire diamond layer and acted to remove the metallic phase substantially uniformly throughout.

The transverse rupture strength (TRS) and Young's modulus of elasticity (E) were also measured for the diamond layers as indicated in TABLE I. The strength test was performed on a three point beam loading device. The device includes two steel rollers situated on a support with a third steel roller centered above with its axis parallel to the other two rollers. The samples were centered over the lower rollers and loaded until fracture occurred. The strain on the samples was measured parallel to the tension stress by use of resistance strain gauges attached to a resistance strain indicator. Samples A-1 to A-4 were prepared for the strength test and surface finishing with a diamond wheel (177 to 250 micrometer diamond particles). Samples B-1 to B-4 were prepared for the strength test by surface finishing with a lapping machine using 15 micrometer diamond abrasive to attain a more flaw-free surface than that obtained on Samples A-1 to A-4 by grinding. It is believed that the better polished surfaces in the samples finished with fine diamond give higher strength values because of the more perfect surface conditions achieved, i.e., fewer stress concentrating defects. This is believed to explain the lower TRS values measured for the leached samples (A-3, A-4, B-3, B-4).

TABLE

| Sample | Removal of Infiltrant (% weight loss) | Transverse Rupture Strength (TRS) (kg./mm.$^2$) | Modulus of Elasticity (E) ($\times 10^3$ kg./mm.$^2$) |
| --- | --- | --- | --- |
| A-1 | 0 | 111 | — |
| A-2 | 0 | 101 | — |
| A-3 | 16.1 | 73 | — |
| A-4 | 16.2 | 87 | — |
| B-1 | 0 | 129 | 89 |
| B-2 | 0 | 143 | 92 |
| B-3 | 17.0 | 88 | 78 |
| B-4 | 17.9 | 81 | 80 |

In contrast to the TRS test results, the E measurements (TABLE I) are not affected by the porosity because E is a measure of the internal strength and rigidity of a material and not microcrack formation. The average change in E was only about 12% lower when the metallic phase infiltrant was removed from the samples. This difference should be corrected for the porosity in the leached samples because $$E = M \cdot C / I$$

E = Young's modulus
M = Moment
C = Distance to Outer Fiber
I = Moment of Inertia of Area
and M·C are not changed, but I has been reduced because the effective area has been reduced in proportion to the porosity. Therefore, if spherical voids and random distribution are assumed $$E = \frac{M \cdot C}{I(1-x)},$$

x = fraction of porosity, the value of E would be larger than measured. The average value $79 \times 10^3$ kg./mm.$^2$ of E for Samples B-3 and B-4 (leached is corrected to be $85 \times 10^3$ kg./mm.$^2$ or about 5% lower than the average value ($90 \times 10^3$ kg./mm.$^2$ of E for Samples B-1 and B-2.

Consequently, the removal of the metallic phase infiltrant has very little effect on E and shows that the strength of the diamond layer is almost totally due to diamond to diamond bonding.

The E value of $90 \times 10^3$ kg./mm.$^2$ is about 10% lower than the average value of $100 \times 10^3$ kg./mm.$^2$ which can be calculated from single crystal diamond elastic constants.

EXAMPLE II

A compact was prepared identically to the procedure given in Example I for Samples A-1 to A-4 except that a 1:1 mixture of 149 to 177 micrometers to 105 to 125 micrometer diamond particles were used in place of the 8 micrometer particles.

The compact prior to leaching was calculated to have 89.1% by weight diamond (96.5% by volume) and 11.9% by weight metallic phase (4.5% by volume). After leaching there is a 11.5% reduction in total weight of the compact or about 0.15% by weight of the metallic phase ((0.06% by volume) remains in the compact.

EXAMPLE III

Four diamond compacts were made as set forth in Example I. The carbide was ground off each compact. Two had the metallic phase infiltrant removed by acid leaching in hot 1HF:1HNO$_3$ and 3HCl:1HNO$_3$ acids. All were then mounted with epoxy onto a 0.89 cm. round tungsten carbide substrate. This composite was mounted in a tool holder in a lathe and abrasion resistance turning tests were then performed. The workpiece was a siliceous sand filled rubber log sold under the trademark Ebonite Black Diamond. Test conditions were: surface speed: 107–168 surface m./min. (within one heat treatment group the maximum range was 24 surface m./min.); depth of cut: 0.76 mm. cross feed: 0.13 mm./rev.; and test time: 60 minutes. After the test, the samples were heat treated in a tube furnace in a flowing dry argon atmosphere. The treatment temperatures were 700° C. to 1300° C. with exposure at 100° C. intervals. The exposure time was 10 minutes at each temperature. After each treatment, the samples were examined for evidence of degradation under a scanning electron microscope (SEM) and then mounted for abrasion testing except for the 1000° C., 1100° C., and 1300° C. treatments. Both top and bottom edges were used as cutting edges before being reground.

The abrasion test results are tabulated in TABLE II. The samples were fairly consistent throughout the test. There was a tendency for a reduction in abrasion resistance from the untreated to the first heat treatment at 700° C. The non-leached smples, Samples 3 and 4, did not change until catastrophic thermal failure between 800° C. and 900° C. The heat treatment was found to be independent of the abrasion resistance until the diamond phase could no longer contain the entrapped metallic phase and cracking occurs. This behavior also indicates the presence of two distinct phases: the bonded diamond phase which is doing the cutting in the test, and the metallic phase which is a remnant of the sintering process. The leached samples, Samples 1 and 2, withstood the heat treatment very well, even to 1200° C. The tendency at 1200° C. appears to be toward a slight degradation of the sample which may indicate the initiation of thermal backconversion on the surface.

TABLE II

| Heat Treatment (°C.) | LEACHED | | NON-LEACHED | |
|---|---|---|---|---|
| | Sample #1 | Sample #2 | Sample #3 | Sample #4 |
| Untreated | 150-200 | 120-150 | 150 | 100-120 |
| 700 | 150 | 120 | 120 | 100 |
| 800 | 120 | 100 | 120 | 100 |
| 900 | 120 | 100 | Radial Cracks | |
| 1000 | — | — | — | — |
| 1100 | — | — | — | — |
| 1200 | 86-100 | 100-120 | — | — |
| 1300 | — | — | — | — |

The test results TABLE II represent time per unit of compact wear in inches times 100. Tool wear was determined by measuring the width of the "flat" on the compact caused by contact with the workpiece. The data is meaningful only to compare the relative performance of the leached and non-leached samples.

The leached samples exhibit on the average a higher test value than the non-leached samples. This may be the result of the thermal degradation of the non-leached compact during the cutting tests machining by the samples. Thus, the same degradation mechanism may be in effect during the abrasion tests as in the heat treatments. If so, when the tool tip is heated to a high temperature when in contact with the workpiece; the cobalt phase is expanded more than the diamond phase and cracks the tip edge within the first few particle layers. The damaged tip is thereby, weakened and poorer performance is exhibited. However, the leached samples are thermally stable to a higher operating temperature and are not thermally damaged when in contact with the workpiece.

SEM analysis revealed that the non-leached samples exhibited many different characteristics when compared to the leached samples. The metallic phase began to extrude from the surface between 700° C. and 800° C. as viewed under 2000X magnification. As the temperature was increased to 900° C., the samples cracked radially from the rounded cutting edge to the center of the sample. The leached samples did not exhibit this behavior but were relatively unchanged until 1300° C. The diamond layers are clean at 1200° C., but at 1300° C. 20X magnification photos look rounded and fuzzy, and 1000X magnification photos show an etched surface with many exposed crystals. This is probably thermal degradation of the surface, but may also be the result of minor oxygen impurities in the argon atmosphere of the tube furnace.

EXAMPLE IV

Two diamond compacts (Samples IV-1 and IV-2) were made as set forth in Example 1, except that the carbide substrates were not ground off. An epoxy plastic (Epon 826 resin with nodic methyl anhydride and benzyl dimethylamine curing agent) was cast around Sample IV-1 and cured. The surface of the diamond layer was exposed by sanding away all of the plastic on the surface of the layer. Sample IV-1 was then placed in boiling $3HCl:1HNO_3$ for 37.15 hours. After removal from the acid, the plastic was removed from the carbide layer and visually examined. Evidence of a slight reaction between the acid and the nonexposed surfaces was seen. However, the surface of the carbide layer did not appear to be significantly damaged by the acid. The surface of the diamond layer was then examined under a SEM (up to 2000X magnification). The surface of the diamond layer had a similar appearance to the surfaces of the diamond layer of the leached samples in Example 1. Sample IV-1 was then examined by energy dispersive X-ray analysis to compare the intensities of the constituents of the metallic phase to that of a compact of the same type which had not been leached. The results of the SEM analysis and the X-ray analysis indicated that the acid penetrated the diamond layer and acted to remove a substantial portion of the metallic phase.

Samples IV-1 and IV-2 were then subjected to abrasion resistance turning test performed in an identical manner to that set forth in Example III above. The abrasion test results (calculated as in Example III) were 120-150 for Sample IV-1 (leached) and 100-120 for Sample IV-2 (unleached). These test results showing the superiority of the leached compact are consistent with the results obtained in Example III and thus substantiates that the removal of the metallic phase in the region of the cutting edge improves the performance of the diamond compact.

While this invention has been shown and described in connection with certain preferred embodiments thereof, other embodiments thereof will be apparent to those skilled in the art. Accordingly, it is intended that all such embodiments be comprehended within the scope of this invention as defined in the claims appended hereto.

We claim:
1. A tool component comprising:
   (a) self-bonded diamond particles, said particles comprising between about 70% and 95% by volume of said component;
   (b) a metallic phase infiltrated substantially uniformly throughout said component, said phase comprising between about 0.05% and 3% by volume of said component and said phase selected from the group consisting of (1) a catalytic metal in elemental form, selected from the group consisting of Group VIII metals, Cr, Mn, Ta; (2) a mixture of alloyable metals of the catalytic metal(s) and non-catalytic metal(s); (3) an alloy of at least two of said catalytic metals; and (4) an alloy of the catalytic metal(s) and non-catalytic metal(s); and
   (c) a network of interconnected, empty pores dispersed throughout said component and defined by said particles and said metallic phase, said pores comprising between about 5% and 30% by volume of said component.

2. The component of claim 1 wherein said diamond particles range in size between about 1 to 1000 micrometers.

3. The component of claim 1 wherein said component has a transverse rupture strength of at least about 35 kg./mm.$^2$.

4. The component of claim 1 wherein said component has a Young's modulus of at least about 70,000 kg./mm.$^2$.

5. The component of claim 1 wherein said component further comprises a cemented carbide substrate bonded to said self-bonded particles.

6. A tool component comprising:
   (a) self-bonded CBN particles, said particles comprising between about 70% and 95% by volume of said component;
   (b) a metallic phase infiltrated substantially uniformly throughout said component, said phase comprising between about 0.05% and 3% by volume of said component, and said phase selected from the group consisting of cobalt, cobalt alloys, and alloys of aluminum and an alloying metal selected from the group consisting of Ni, Mn, Fe, V, and Cr; and (c) a network of interconnected, empty pores dispersed throughout said component and defined by said particles and said metallic phase, said pores comprising between about 5% and 30% by volume of said component.

7. The component of claim 6 wherein said CBN particles range in size between 1 to 300 micrometers.

8. The component of claim 6 wherein said component has a transverse rupture strength of at least about 35 kg./mm.$^2$.

9. The component of claim 6 wherein said component has a Young's modulus of at least about 50,000 kg./mm.$^2$.

10. The component of claim 6 wherein said component further comprises a cemented carbide substrate bonded to said self-bonded particles.

11. A tool component comprising:
(a) self-bonded particles selected from the group consisting of diamond and cubic boron nitride, said particles comprising between about 70%; and 95% by volume of said component;
(b) sintering aid material comprising between about 0.05% and 3% by volume of said component; and
(c) a network of interconnected, empty pores dispersed throughout said component and defined by said particles and said sintering aid material, said pores comprising between about 5% and 30% by volume of said component.

12. The component of claim 11 wherein said CBN particles range in size between about 1 to 300 micrometers.

13. The component of claim 11 wherein said diamond particles range in size about 1 to 1000 micrometers.

14. The component of claim 11 wherein said component has a transverse rupture strength of at least about 35 kg./mm.$^2$.

15. The component of claim 11 wherein said component has a Young's modulus of at least about 50,000 kg./mm.$^2$.

16. The component of claim 11 where said component further comprises a cemented carbide substrate bonded to said self-bonded particles.

* * * * *